Fig. 1

June 4, 1957 E. A. ROCKWELL 2,794,320
POWER AUGMENTATION APPARATUS FOR HYDRAULIC MOTOR SYSTEMS
Filed June 17, 1950 4 Sheets-Sheet 3

INVENTOR.
EDWARD A. ROCKWELL
BY
Fulwider & Mattingly
Attorneys

June 4, 1957         E. A. ROCKWELL         2,794,320

POWER AUGMENTATION APPARATUS FOR HYDRAULIC MOTOR SYSTEMS

Filed June 17, 1950         4 Sheets-Sheet 4

INVENTOR.
EDWARD A. ROCKWELL
BY Fulwider & Mattingly
Attorneys

United States Patent Office 2,794,320
Patented June 4, 1957

2,794,320

POWER AUGMENTATION APPARATUS FOR HYDRAULIC MOTOR SYSTEMS

Edward A. Rockwell, Los Angeles, Calif.

Application June 17, 1950, Serial No. 168,814

11 Claims. (Cl. 60—54.5)

The present invention relates generally to hydraulic and pneumatic power devices, and more particularly, to a fluid power system for the intensification and transmission of hydraulic power for the operation of fluid-actuated devices such as brakes.

The present invention relates to my prior patent, No. 2,398,252, entitled Intensifier Valve, issued April 9, 1946; and also to my copending applications, Serial No. 507,227, entitled Intensifier for the Application of Power, filed October 20, 1943, now Patent No. 2,564,582, issued Aug. 14, 1951; Serial No. 729,931, entitled Sealing Means, filed February 21, 1947, now Patent No. 2,593,193; and Serial No. 611,985, entitled Tandem Power Unit for Applying Hydraulic Pressure, filed August 22, 1945, now Patent No. 2,603,066. The present invention, as well as certain of the prior patent and co-pending applications above listed, relates to systems in which two volumes of fluid at the same pressure are added together, one being delivered by a manually operable device, and the other being delivered by a device receiving external or supplementary power. Such systems are to be contrasted with previous systems in which two or more forces, each separately produced by possibly differing hydraulic pressures, are added together to act on a common member to produce a third hydraulic pressure for actuating the brake cylinder or other fluid motor. Such previous systems are generally termed "booster" systems and will be so referred to herein.

To recapitulate briefly, my system adds volumes at equal pressures; the prior systems add differing forces but do not add volumes.

As will hereinafter be pointed out, the volume-adding system of this and my previous inventions has many advantages. I have found, however, that such advantages cannot be fully achieved unless certain specific arrangements of elements are employed.

It is, then, a major object of my invention to provide an arragement of elements in a hydraulic power intensifying unit which achieves the fullest advantage of the volume-adding system.

It is another object of the present invention to provide a structure of the class described in which the parts are capable of mass production and ready assembly.

Still another object of the invention is to produce a structure of the type described which can readily be tested both as a final assembly and as individual component parts during the assembly thereof.

A further object of the invention is to provide in a unit of the class described a unique control valve assembly which is readily adaptable to serve additionally as a filter for air employed in the supplementary power chamber.

A still further object is to provide an assembly in which the parts subject to wear are quickly and easily replaceable as subassemblies.

Yet another object of the invention is to provide a pressure-intensifying unit of the class described which is adapted to be connected both to the brakes of the prime mover unit, such as a truck, bus or tractor, and additionally to the control line of a similar power unit in a trailer.

A still further object of the invention is to provide a simplified and low cost reservoir for vacuum employed as supplemental power.

Yet another object of the invention is to provide a structure in which the hydraulic cylinders may be constructed of relatively low cost tubing as compared to cast cylinders conventionally employed in such structures.

Yet another object of the invention is to provide novel locking means for hydraulic cylinder tubes employed in the device.

Still another object of the invention is to provide a novel sealing arrangement which reduces so-called seal friction to a minimum.

A still further object of the invention is to provide an improved fluid control assembly incorporating a grommet valve.

As compared to previous devices of a similar purpose, the structure about to be described, in accordance with the foregoing objects, provides a number of important advantages, among which are the following:

1. The supplemental power means may be so controlled as to "cut in" early in the operation of the unit and the proportioning of power forces and reactive frictional forces is such that non-chattering operation is achieved;

2. The vacuum reservoir above referred to may be incorporated in the power unit itself, thus requiring no additional or separate reservoir in the system;

3. The arrangement of the flexible duct delivering air to the supplementary power means is such that it can be relatively large, yet flexible, and still will not be overstressed during any portion of the operation stroke of the device;

4. The proportioning of the dynamic and reactive forces above referred to is such that it is possible to so adjust the device that exteremely light pedal forces are required to initiate the operation of the brake system;

5. Relatively high boost ratios are possible by reason of a material reduction in seal friction, due to the novel construction incorporated in the pressure sealing means;

6. The aforementioned arrangement of the flexible air duct makes possible an advantageous position of the air inlet, as well as advantages in assembling the unit;

7. Stability of the device in the so-called "lapped" position in which a given brake pressure is being maintained without either increasing or decreasing the same, is possible by reason of the balancing of the control valve;

8. A dependable and definite "off" position of the unit is made possible by the balancing of the valve and also by the reduction in seal friction;

9. Uniformity in operation over the entire stroke is achieved by positioning the manual and supplemental hydraulic cylinders close together and a minimizing off-center loading;

10. Separate tubular cylinders, as described above, make it possible to more accurately finish the interiors thereof and with greater ease.

The foregoing and additional objects and advantages of the invention will be apparent from consideration of the following detailed description of a brake power unit embodying the same, such consideration being given likewise to the accompanying drawings, in which.

For a clear understanding of the details of construction to be described later, it is desirable first to have an understanding of the general construction and function of the overall system. For such preliminary discussion, reference should be had to Figure 1.

Figure 1:
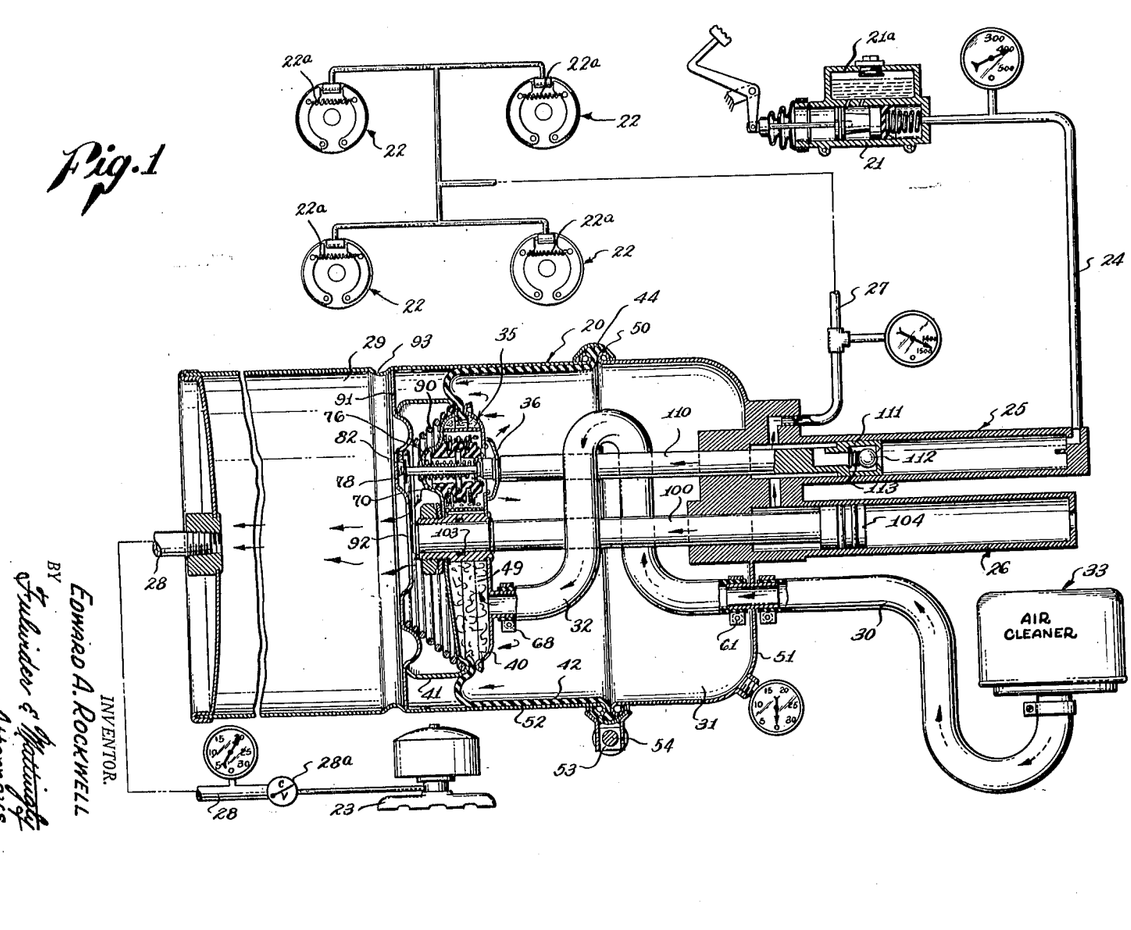
Figure 1 is a partially schematic elevational section of a power unit embodying the present invention, shown connected to the various elements of the hydraulic brake system in a motor vehicle.

In Figure 1, the power unit per se is indicated by the reference character 20. The power unit 20 serves to add a volume of fluid delivered to conventional fluid brakes 22 to a volume delivered by a conventional master cylinder 21. The master cylinder 21 is connected by a fluid conduit 24 to a control cylinder 25, forming a part of the power unit 20, and from the power unit 20, fluid is delivered through a conduit 27 to the brake system comprising the brakes 22.

The actual movement of fluid from the power unit 20 to the brakes 22, in addition to that supplied by the master cylinder, is produced by a pump or power cylinder 26 actuated by an air-vacuum piston assembly 35 which, in turn, is moved by differential pressures on the opposite sides thereof. Such differential pressures are created in two chambers 29 and 31 of the power unit 20, the former 29 being a vacuum chamber, and the latter 31 being under conditions of operation, at atmospheric pressure. Vacuum is created in the chamber 29 by connecting the same through a conduit 28 to the intake manifold 23 of the motor vehicle involved. The regulation of the differential pressures in the chambers 29—31 is responsive to and under the control of the master cylinder pressure and in this sense the power unit 20 may be considered as including a servomotor.

Air is delivered as hereafter described into the pressure chamber 31 through a suitable relatively large conduit 30, the same being provided with an air cleaner 33, since air passing through the power unit 20 eventually reaches the intake manifold and thus should be free of dust and other abrasive materials.

From the conduit 30 air passes through a flexible interior conduit 32 to a space or intermediate chamber 49 within the piston assembly 35 and thence, under the control of a valve assembly 36 into the chamber 31.

Generally, operation of the system is as follows. A certain volume of fluid is delivered from the master cylinder 21 through the conduit 24, the control cylinder 25, and the conduit 27 to the brakes 22. Simultaneously, by reason of the action of the control assembly, hereinafter to be described, the power unit 20 is operated to force an additional volume (at equal pressure) from the power cylinder 26 through the conduit 27 to the brakes 22.

Figure 2:
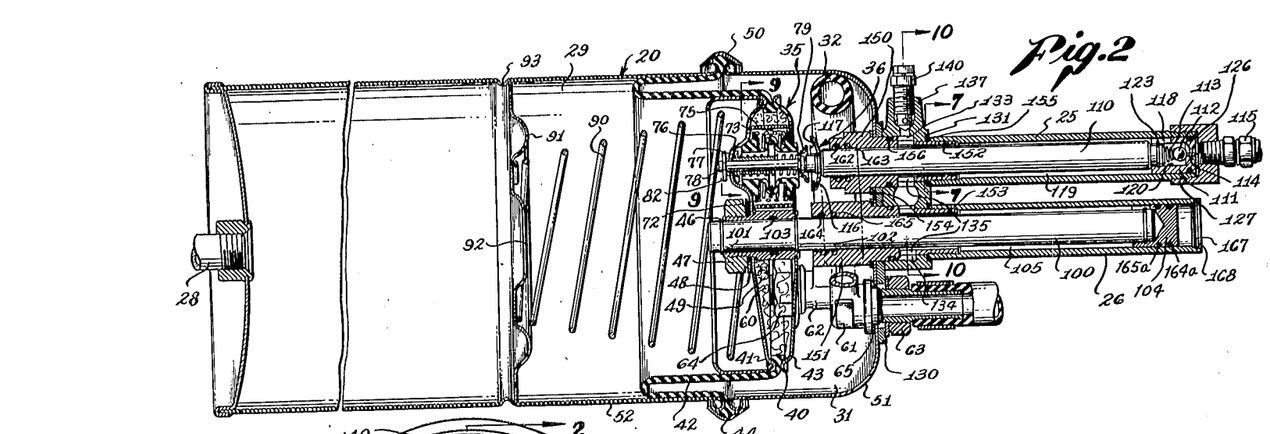
Figure 2 is an elevational section similar to Figure 1, but showing the actual construction of the power unit.
Figures 13, 15:
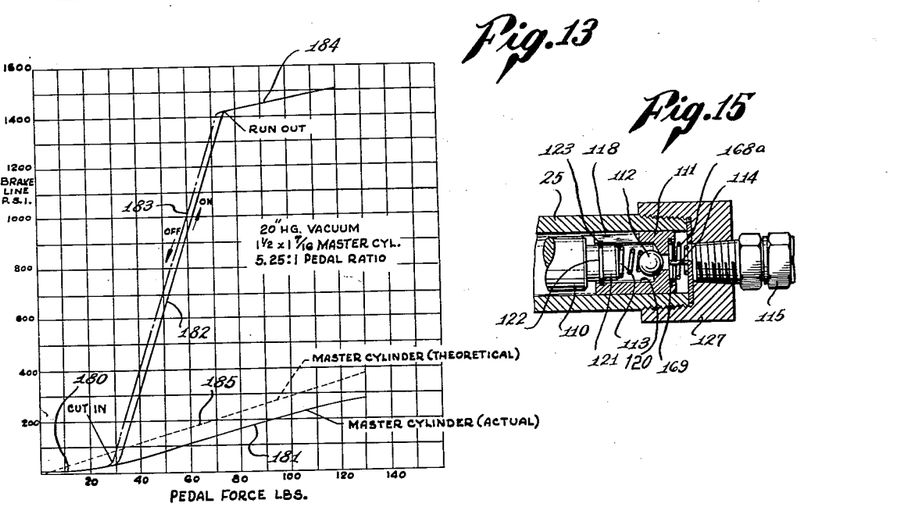
Figure 13 is a graph illustrating the operation characteristics of the power unit embodying my invention.
Figure 15 is an enlarged elevational axial section illustrating an alternative construction for retaining residual pressures in the brake line.
Figure 14:
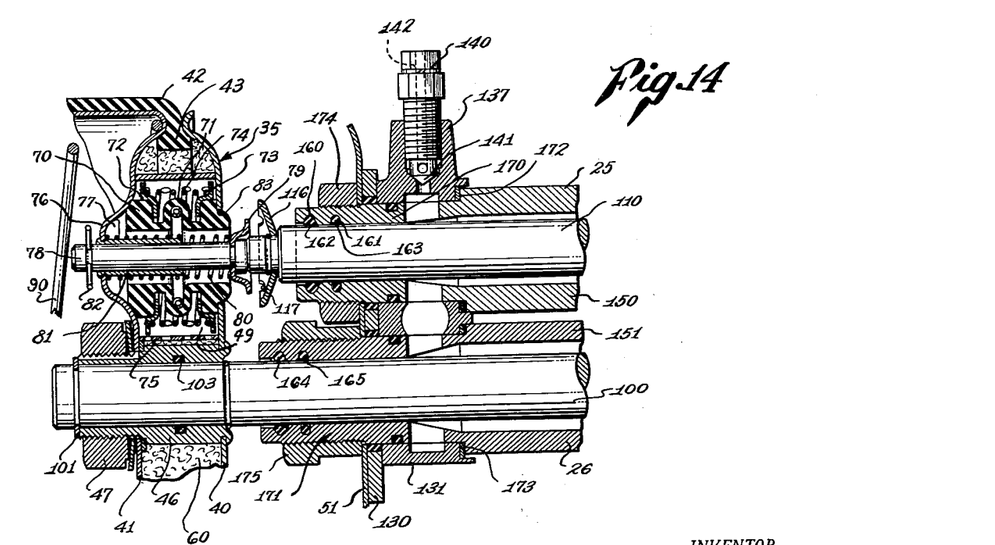
Figure 14 is an enlarged elevational axial section of a modified form of the device illustrated in Figure 2, wherein an alternate means is employed for securing the hydraulic cylinders.

For a more detailed description of the construction and operation, reference should now be had to Figures 2, 13 and 14. Here it will be seen that the air-vacuum piston assembly comprises a pair of opposed dished pressure plates 40—41 which are peripherally secured to a flexible diaphragm 42, which diaphragm in turn is secured at its outer periphery between housing sections 51—52 forming the vacuum and pressure chambers 29 and 31, respectively. Thus, the pressure plates 40—41 and the diaphragm 42 cooperate to form a movable pressure-tight wall separating the two chambers 29—31.

The pressure plates 40—41 are held together by means of an interior bushing 46, which is spun onto the right-hand pressure plate 40, and has a threaded extension projecting throught he left-hand pressure plate 41, a securing nut 47 being threaded onto the bushing 46 and provided with a conventional lock washer 48 to hold the two plates 40—41 together.

The diaphragm 42 is generally annular in shape, having beads 43 and 44 formed on the interior and exterior edges, respectively. The interior bead 43 is clamped between the peripheral edges of the pressure plates 40—41, and the exterior bead 44 is clamped between housing portions 51 and 52. Clamping action of the pressure plates 40—41 is achieved by tightening the nut 47, while secure clamping engagement of the housing portions 51—52 is achieved by means of a generally V-shaped band 50 surrounding said housing portions at the juncture thereof and being provided with terminal abutments 53 to receive a clamping bolt 54, having thereon a clamping nut 55.

As have been previously stated, the pressure plates 40—41 form an intermediate chamber 49 through which air is delivered into the power chamber 31. In order that such air will be additionally filtered, the space between the plates 40—41 is filled with a filtering material 60, such as hair felt or the like.

The interior conduit 32 which delivers air into the intermediate chamber 49 is secured between the intermediate chamber and the exterior of the housing portion 51 by means of a pair of elbow fittings 61 and 62, the former being secured in the end wall of the housing portion 51, and the latter being secured in the pressure plate 40. The fittings 61 and 62 are formed with threaded extensions onto which securing nuts 63 and 64 are threaded to hold the fittings in place. Conventional sealing gaskets 65 and 66 are positioned under the securing nuts 63—64 in order to form a hermetic seal around the respective fittings in the walls in which they are secured.

Figures 3, 4, 5:
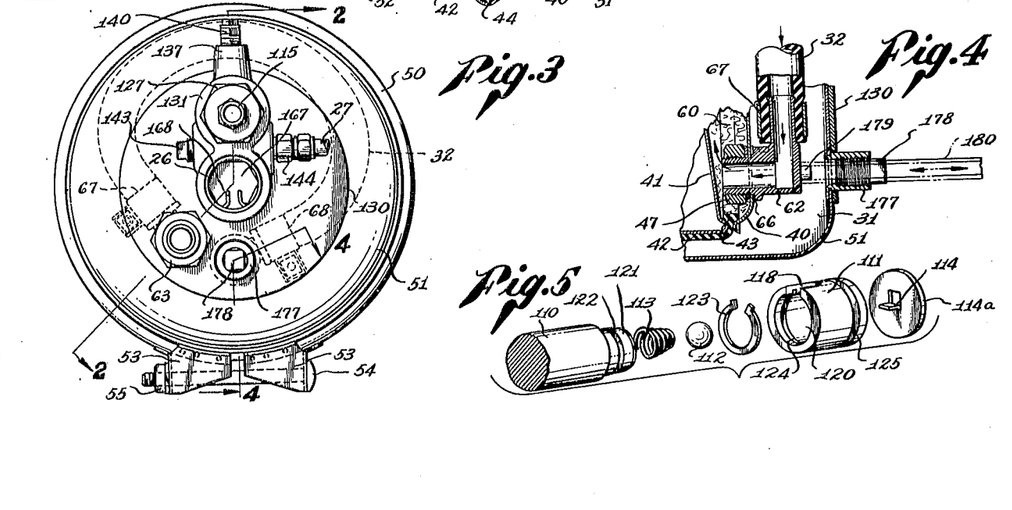
Figure 3 is an end elevational view of the device shown in Figure 2 as seen from the right.
Figure 4 is a fragmentary elevational and oblique section taken on the line 4—4 in Figure 3, illustrating one of the steps in assembling the power unit.
Figure 5 is an exploded, perspective view of parts of the hydraulic control and plunger of the device shown in Figure 2.

The conduit 32 is comprised of a relatively large diameter tubing capable of withstanding a pressure equal to atmospheric, is attached to the fittings 61—62 by conventional tube clamps 67 and 68, and is disposed in a C-shape within the chamber 31, as is best seen in Figure 3. As the air-vacuum piston assembly moves to the left, the conduit 32 assumes a helical configuration within the chamber 31.

Thus, it will be seen that the intermediate chamber 49 is, at all times, at substantially atmospheric pressure, this pressure differing from atmospheric only by the slight amount resulting from flow resistance in the conduits 30—32 and in the air cleaner 33.

Movement of the air-vacuum piston assembly 35 is, as has been stated, produced by admitting air into the power chamber 31. Inasmuch as a vacuum exists at all times in the chamber 29, the force tending to move the piston assembly 35 to the left will depend on the then pressure in the chamber 31. The pressure in the chamber 31 is adjusted by operation of the control valve assembly 36, the details of which are best seen in Figure 14. Here the valve assembly is shown in its normal off, or unoperated position. In Figure 2, the valve assembly is also shown in its "off" position, and in Figure 1, the valve is shown in "on" or operated position, and it will be seen that, as a result, the piston assembly 35 has moved to the extreme left-hand end of its movement.

The valve assembly 36 includes a grommet valve 70 which consists of a tubular bellows-like member of rubber, synthetic rubber, or similar flexible material, normally disposed with its ends abutted against the interior surfaces of the opposed pressure plates 40—41. The walls of the valve 70 are corrugated, as indicated at 71, whereby to permit longitudinal contraction and elongation of the valve 70 which contraction and elongation results in seating and unseating certain valve portions, as will hereinafter be described.

Normally, the valve 70 is held in its most elongated condition by means of a pair of slightly dished washers 72 and 73 which encircle the valve 70, are engaged with terminal flanges or shoulders on the valve, and are forced apart by a compression spring 74. Thus, the valve 70 is normally held with its ends in tight sealing engagement with the interior surfaces of the chamber 49, whereby to prevent the passage of air out of the chamber 49. Adjacent the right-hand end of the valve 70, an orifice 83 is found through the pressure plate 40.

A perforated tubular member 75 is secured to one of the pressure plates 40—41 within the chamber 49 and surrounds the entire valve assembly 36 whereby to prevent the filtering material 60 from interfering with the operation of the valve 70, hereinafter described.

Formed in the left-hand pressure plate 41, adjacent the left end of the valve member 70 is a small cup-shaped extrusion 76, having perforations 77 (see Figure 9) whereby to communicate the vacuum in the chamber 29 with the interior of the valve member 70.

Coaxial within the extrusion 76 and spaced from the interior wall of the valve 70 is a movable valve seat assembly comprising a slidable plunger 78 having an inverted, hat-shaped valve seat 79 secured to the right-hand end thereof. A compression spring 80 normally urges the plunger 78 and the valve seat 79 to the right. The plunger 78 is slidably carried in a bushing 81 which is spun into the left-hand pressure plate 41, and is limited in its movement to the right by a snap ring or wire clip 82 carried by the left-hand end thereof.

It will be noted that when the valve is in the condition shown in Figure 14, the movable valve seat 79 is lifted from the end of the valve 70 and thus the vacuum in the chamber 29 is communicated through the interior of the valve 70 into the power chamber 31. Accordingly, no pneumatic forces are exerted on the piston assembly 35.

When the plunger 78 is moved to the left with respect to the piston assembly 35 (as by control means hereinafter described), the movable seat 79 is brought to rest against the end of the valve 70, thus blocking any further communication between the chambers 29—31. At that point, both chambers are isolated and the valve is said to be in "lapped" position.

Continued leftward movement of the valve seat 79 contracts the valve 70, lifting its right-hand flange from contact with the pressure plate 40, and permitting air within the intermediate chamber 49 to flow through the now annular orifice 83 in the pressure plate 40, and into the chamber 31. This produces a differential pressure between the chambers 29 and 31, tending to move the air-vacuum piston assembly 35 to the left.

Such leftward movement of the piston assembly 35 is, as will hereinafter be described in more detail, self-terminating in that the entire valve assembly moves away from the control means, permitting the valve 70 to elongate and reseat the right-hand flange thereof against the pressure plate 40, terminating the flow of air into the power chamber 31.

Normally, the piston assembly 35 is held near, but not quite at its right-hand limited position by a conical compression spring 90 seated between an anchor plate 91, and the left-hand pressure plate 41. The anchor plate 91 is centrally perforated, as indicated at 92, and is supported on an inwardly rolled bead 93 formed in the housing section 52. The housing section 52 extends considerably to the left of the bead 93, thus forming a vacuum reservoir integral with the power unit 20.

It will be realized that each operation of the valve assembly which lifts the movable valve seat 79 to communicate the two chambers 29—31 results in dumping the air in the chamber 31 into the vacuum reservoir. Such air is, of course, removed through the conduit 28 leading to the intake manifold by the continued operation of the motor vehicle. If the chamber 29 is made several times the volume of the chamber 31, and if other forces are properly balanced, as will hereinafter be described, a large number of successive operations of the power unit 20 are possible, without exhausting the vacuum power in the reservoir comprising the chamber 29.

The means by which movement of the piston assembly 35 is translated into fluid pressure may be best understood by reference to Figure 2. A connecting rod 100 is secured at its left-hand end within the bushing 46 by a pair of snap rings 101 and 102. In order to prevent leakage of air pressure betweeen the chambers 29—31, a sealing O-ring 103 is positioned in an annular groove within the bushing 46, surrounding the rod 100. The right-hand end of the rod 100 carries a hydraulic piston 104 which has sliding, fluid-tight contact with the interior wall of the power cylinder 26. Sealing means of a novel design, hereinafter to be described in detail, form a fluid-tight seal between the interior wall of the cylinder 26 and the piston 104.

Hydraulic fluid is contained in the annular space 105 surrounding the rod 100 and within the cylinder 26. Thus, as the piston assembly 35 moves to the left, the hydraulic piston 104 is moved to the left, forcing hydraulic fluid out of the chamber 105 and hence to the brake system, as will hereinafter be described.

The control of the valve assembly 36 is accomplished by a follow-up thrust rod 110 coaxially positioned within the control cylinder 25. The thrust rod 110 also carries a hydraulic piston 111 at its right-hand end, which piston 111 is slidable within the control cylinder 25, and in sealing contact therewith. The control piston 111 is formed with an internal cavity 120 in which is positioned a check valve 112, urged to a closing position by a compression spring 113, but held open by a finger 114 when the piston 111 is in the right-hand limiting position of its travel. The finger 114 is fixedly mounted in the right-hand end of the control cylinder 25 and thus, as soon as the piston 111 moves to the left, the valve 112 is closed against its seat within the piston 111. So long as the piston remains at the extreme right-hand end of the cylinder 25, however, fluid may pass freely through the piston (note the notch 118 in the skirt) into the annular chamber 119 surrounding the rod 110.

The fluid connection 115 of the conduit 24 leading from the master cylinder 21 is located at the extreme right-hand end of the control cylinder 25, and thus any fluid delivered from the master cylinder to the brakes must first pass through the hydraulic piston 111.

The details and method of attachment of the hydraulic control piston 111 are shown in Figure 5. Here it will be seen that the piston 111 is hollow with an internal cavity 120 and the aforesaid notch 118 cut through in the wall or skirt of the cavity 120. The right-hand end of the rod 110 is reduced in diameter to form a boss 121, dimensioned to relatively loosely fit into the cavity 120 whereby to permit self-alignment of the piston 111 in the cylinder 25. In the boss 121 is a snap ring groove 122 to receive a snap ring 123 of beryllium copper or similar shear-resistant resilient material. Within the cavity 120 is a complemental groove 124 into which the snap ring 123 also fits. The radial width of the snap ring 123 is such as to extend inwardly into the inner groove 122 when the ring is seated in the outer groove 124.

Conventional terminal lugs on the ring 123 permit the same to be contracted for insertion into the cavity 120, and the inherent resilience of the ring 123 causes the same to expand into the groove 124 when it is aligned therewith. Groove 122 is made deep enough so that the ring may be contracted sufficiently to pass within the cavity 120, but not deep enough to permit overstressing of the ring 123 upon said contracting thereof. The notch 118 in the wall of the cavity 120 is sufficiently wide to permit the manipulation of the terminal lugs on the ring 123 while the piston 111 is being assembled onto the boss 121 at the end of the rod 110.

At the same time that the piston 111 is being assembled onto the rod 110, the valve 112 which consists of a conventional spherical member and the valve spring 113 are also introduced into the cavity 120, the spring 113 pressing against the outer end of the boss 121.

The valve-lifting finger 114 is struck out of a thin disc of sheetmetal or other similar material 114a. The disc 114a is secured against the outer end of the control cylinder 25 by means of a threaded cap 127 (see Figure 2), the outer or right-hand end of the cylinder 25 being externally threaded to receive the cap 127.

The piston 111 is formed with an external groove 125 to receive a conventional sealing O-ring 126 which makes sealing contact against the wall of the control cylinder 25. Only a single sealing ring is required at this point since the pressure retained by the seal is only the differential between the pressure in the master cylinder and that in the brake system. In any event, should slight leakage occur past the piston 111, no serious detriment will result since the fluid contents of the two systems on opposite sides of the piston 111 may readjust themselves whenever the piston is at the right-hand, extreme position, and the valve 112 is held open.

The means for securing the power piston 104 to the rod 100 are similar to those just described in connection with the control piston 111.

The relative diameters of the rods 100 and 110, as well as the relative cross-sectional areas of the annular spaces 105 and 119 surrounding such rods, and the relationship between the effective diameters of the hydraulic pistons, are all interrelated and affect the proper operation of the valve assembly. This relationship will be discussed later herein. Suffice it to say for the moment that upon initial operation of the master cylinder 21, the net effect is to cause movement of the air-vacuum piston assembly to the right (Figure 1) and concurrent movement of the rod 110 to the left.

As can be seen in Figure 2, the rod 110 is coaxially aligned with the plunger 78 so that the counter-movement just described causes operation of the valve to close the movable valve seat 79 against the valve 70 and, if such movement is continued, to open the right-hand flange of the valve 70 away from the pressure plate 40, thus admitting air through the orifice 83 into the chamber 31 to actuate the power unit. The force exerted by the rod 110 must, of course, be sufficient to overcome the compressive force of the valve spring 80 to reach "lapped" position, and thereafter must overcome the forces of the two springs 80 and 74 in order to open the valve to admit air into the chamber 31. Thus, the adjustment of the spring rates is another important factor to operation of the system.

It will be noted that the diameter of the control rod 110 is substantially equal to the diameter of the bore opening in the valve 70 against which the movable valve seat 79 closes. Thus, the increasing spring rate of the spring 80 is compensated by the effects of pressure (and vacuum) in the chamber 31 on the movable valve seat 79 and the rod 110, respectively. When the movable valve seat 79 is against the valve 70, it will be seen that the differential pressures in the reservoir 29 and the chamber 31 act on the valve seat 79 to hold it closed. It is also evident that the force on the rod 110 tending to eject it from the chamber 31 is relatively greater when the seat 79 is closed than when it is open and a vacuum exists in the chamber 31. Thus, the force required to operate the valve assembly 36 is substantially uniform at all effective parts of the stroke. This, in turn, reduces the valve operating pressure and movement to a minimum and permits a relatively large number of brake operations without depleting the vacuum reservoir.

The thrust rod 110 carries at its left-hand end a dished flange member 116, the purpose of which is to limit the leftward movement of the thrust rod 110 with respect to the pressure plate 40, as can be seen best in Figure 1. Peripheral notches 117 are formed in the flange 116 so as not to interfere with the flow of air from the intermediate chamber 49 into the power chamber 31 when the flange 116 is in its limiting position against the pressure plate 40.

Turning now to the discussion of the means by which the cylinders 25 and 26 are secured to the housing member 51, reference should be had to Figures 2, 6, 7 and 10.

Figures 6, 7, 8, 9, 10, 11, 11A, 12, 12A:
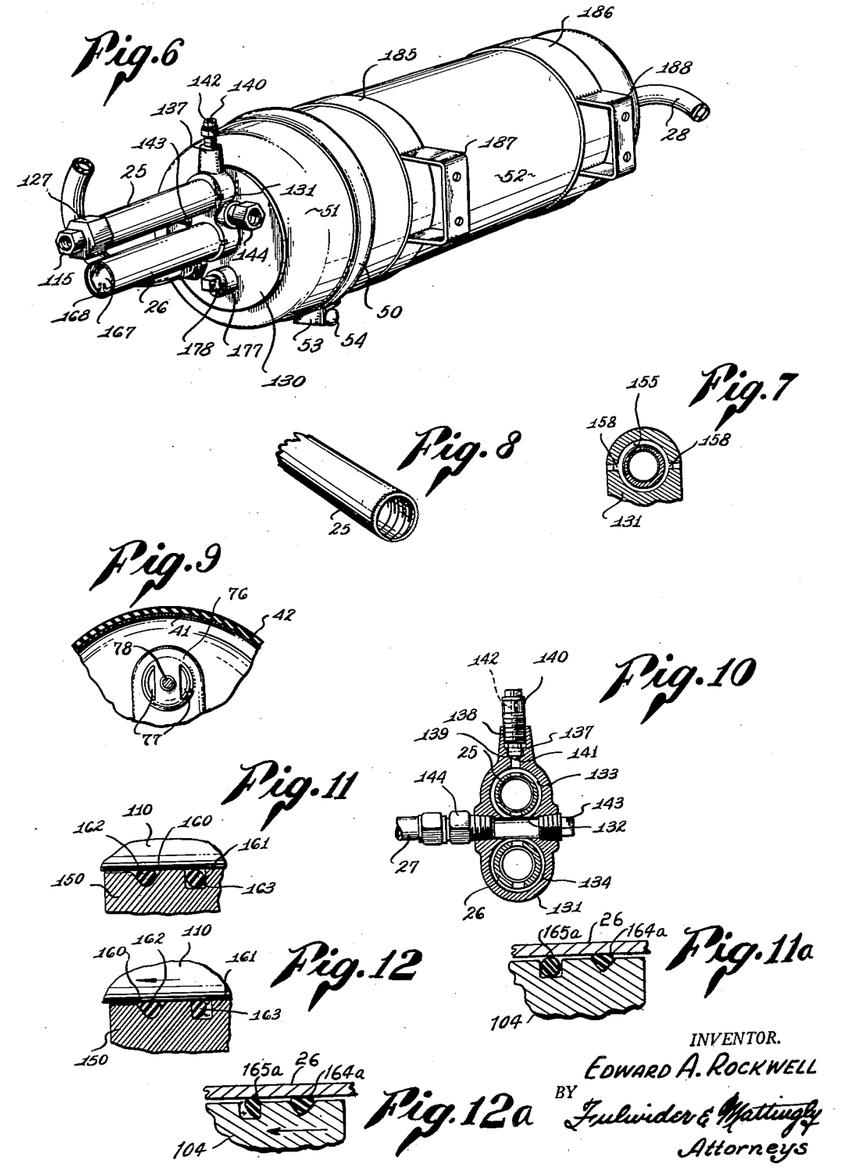
Figure 6 is a perspective view of the assembled power unit, illustrating the mounting brackets and operative fluid connections thereof.
Figure 7 is an elevational section taken on the line 7—7 in Figure 2.
Figure 8 is a perspective view of the inner end of one of the hydraulic cylinder tubes employed in the device of Figure 2.
Figure 9 is an elevational partially sectioned view taken on the line 9—9 in Figure 2.
Figure 10 is an elevational section taken on the line 10—10 in Figure 2.
Figure 11 is an enlarged elevational partially sectioned view of the sealing rings employed in the device of Figure 2, the same being shown in the negligible pressure static condition.
Figure 12 is a view similar to Figure 11, showing the sealing rings in dynamic or substantial pressure condition upon operative movement of the plunger in the direction indicated by the arrow therein.
Figures 11a and 12a are similar to Figures 11 and 12, respectively, and show the sealing rings as used on a piston.

As is seen best in Figure 6, a flat reinforcing plate 130 is brazed or welded to the end of the housing portion 51 whereby to reinforce the same and also to provide a plane surface against which attachment fittings may be secured. The two cylinders 25 and 26 are supported in a mounting fitting 131 having a pair of relatively closely spaced parallel bores to receive the cylinders. As can be seen in Figure 10, the fitting 131 is also formed with a threaded opening to receive the high pressure conduit 27 which leads to the brake system, and has an internal passageway 132 and internal annular recesses 133 and 134 surrounding the cylinders 25 and 26 whereby to serve as a fluid manifold to intercommunicate the two cylinders within the fitting 131.

At the top of the fitting 131, a boss 137 having a threaded opening 138 and a valve seat 139 is formed. A threaded plug 140 having a conical valve portion 141 at the lower end thereof is received in the threaded opening 138. The threaded plug 140 has an interior passageway 142 terminating in lateral passageways above the conical valve portion 141, the plug 140 thus serving as an air relief valve whereby air may be bled from the hydraulic system by loosening the plug to raise the valve portion 141 from the seat 139. When air has been removed in this manner, the plug 140 is retightened to close the system.

The lateral passageway 132 is threaded at both ends and a threaded plug 143 is secured in one end whereby the system may be filled with hydraulic fluid. A connector fitting 144 at the opposite end of the passageway 132 secures the conduit 27. If desired, an additional brake conduit can be connected to the passageway 132 instead of the plug 143.

The fitting 131 is held in place by a pair of shouldered bushings 150 and 151, having threaded extensions 152 and 153 which extend through and beyond the fitting 131 and receive the internally threaded ends of the cylinders 25 and 26. Thus, by threading the cylinders 25 and 26 tightly home against the fitting 131, the same is held in place securely against the reinforcing plate 130. Suitable sealing gaskets or washers 154 and 155 provide hermetic seals under the shoulder of the bushing 150, and under the control cylinder 25. Similar gaskets are provided on the bushing 151. Lateral openings 135 are formed in the bushings 150—151 to communicate the interiors thereof with the annular recesses 133 and 134, respectively.

The bushing 150 is externally grooved and carries a sealing O-ring 156 within the fitting 131 whereby to form a hydraulic seal at this point. A similar O-ring is mounted on the bushing 151.

As can be seen best in Figure 8, the edge or corner of the cylinders 25 and 26 adjacent the inner (left-hand) end thereof is knurled so as to dig into and tightly grip against the sealing washer or gasket 155, which is preferably of a malleable material such as copper. As shown in Figure 7, the sealing washer 155 is formed with lateral ears 158 which fit into appropriately aligned keyways in the fitting 131. Thus are the cylinders 25 and 26 locked into place and prevented from unscrewing due to vibration and the like.

The thrust and control rods 100 and 110 extend through the bores in the bushings 150 and 151 into the chamber 31. It is, of course, necessary to prevent escape of hydraulic fluid from the space and passages within the fitting 131 into the chamber 31. It is also desirable that whatever means is used to prevent such leakage present a minimum of reactive frictional forces tending to prevent free movement of the rods 100 and 110. To this end, a novel sealing means comprising a cooperative pair of sealing O-rings is mounted in each of the bushings 150 and 151.

The nature of the low friction sealing means is best seen from an examination of Figures 11 and 12. Since an identical pair of O-rings is employed in each of the bushings, the sealing means need be described only in connection with one of the rods and bushings, i. e., the control rod 110 and its bushing 150.

In the bushing 150 is formed a pair of undercut grooves 160 and 161. One of the grooves 160 is V-shaped and of such depth that the O-ring 162 therein is slightly deformed whereby to form what is termed herein a static seal against the rod 110.

The other groove 161 is of a U-shaped cross-section and sufficiently deep so that the O-ring 163 therein is not appreciably deformed or flattened against the rod 110. During static, low pressure conditions of operation, the O-ring 163 in the groove 161 is substantially free in the groove 161, and performs no function in sealing the system. As soon as fluid pressure is exerted in the hydraulic side of the system, however, the O-ring 163 is forced, by fluid pressure and also by movement of the rod 110, up against one side of the groove 161. Thus, a relatively tight hermetic seal is formed at this point, the ring 163 also being forced by hydraulic pressure against the rod 110.

Thus, in short, the sealing during low pressure conditions is provided by the ring 162 in the V-shaped groove 160, the ring 163 serving only to seal the system during relatively high pressures and/or movements of the rod 110. By this arrangement, an optimum condition can be reached wherein the frictional reactive forces exerted by the sealing rings 163 and 162 are the minimum required to achieve a hermetic seal of the hydraulic system.

A similar pair of sealing rings is provided in the power piston 104, and identified by the reference characters 164a and 165a. The arrangement, movement, and mode of operation of the sealing rings 164a and 165a are illustrated in Figures 11a and 12a corresponding generally to Figures 11 and 12, respectively.

In order to prevent dirt or dust from being drawn into the outer end of the power cylinder 26 when the piston 104 moves inwardly therein, a small shoulder is formed in the interior of the outer end of the cylinder 26, a loosely fitting disc 167 positioned therein and held in place by a snap ring 168. A slight amount of play between the disc 167 and the ring 168 is provided whereby air may be forced out of the cylinder 26 against comparatively little resistance, but whereby inward movement of air is highly resisted by the fact that the disc 167 is drawn tightly against its shoulder within the cylinder 26. It should be realized that the few pounds of resistance afforded by the partial evacuation which results within the cylinder 26 is a negligible effect on the operation of the device since the force applied on the power rod 100 is on the order of six hundred pounds.

In conventional brake systems, provision is often made in the form of a check valve in the master cylinder for maintaining a certain residual pressure in the entire system, so that the pressure applied by the master cylinder does not start from zero but from such residual pressure.

An alternate arrangement for producing this residual pressure is illustrated in Figure 15. Here an additional conical compression spring 168a is secured to the right-hand end of the piston 111 by an annular retaining groove 169 whereby to additionally resist rightward movement of the piston 111. Thus, it will be seen that in the form shown in Figure 15, additional excess force on the left-hand end of the piston 111 is required in order to open the valve 112.

In Figure 14, an alternate means for securing the cylinders 25 and 26 to the housing portion 51 is illustrated. Again, a reinforcing plate 130 is secured to the end of the housing portion, but instead of employing a pair of bushings as in the previous embodiment, threaded extensions 170 and 171 are formed on the ends of the cylinders 25 and 26, respectively, and the cylinders are shouldered at 172 and 173. Thus, conventional securing nuts 174 and 175 are threaded onto the extensions 170 and 171 to secure the cylinders 25, 26, and the fitting 131 in place. One of the nuts 175 is shouldered so as to clear the other 174.

In the alternate form shown in Figure 14, the cylinders 25 and 26 are swaged down to reduce the internal diameter at the left ends thereof, and the swaged end portions are bored out and undercut to form the retaining grooves for the sealing rings 163 and 162.

In the assembly of the power unit 20, all of the portions forming the hydraulic system, i. e., the cylinders 25 and 26, the fitting 130, the bushings 150 and 151, etc., are first fastened to the housing portion 51. In that condition, the hydraulic subassembly can be tested for leaks and proper operation. Also the pressure plates 40 and 41, the valve assembly 36, and the diaphragm 42 are all assembled together, and may be tested as a separate unit. Such test may be made for example by introducing air under pressure at the fitting 62 and immersing the entire assembly in water whereby any leaks will be indicated by bubbles.

Then the housing portion 51 and the hydraulic subassembly carried thereby is pneumatically connected to the piston assembly 35 by means of the internal flexible conduit 32, the rod 100 attached by the snap ring 101, and the piston assembly 35, and thereafter, the housing member 51 is assembled with the housing portion 52 by means of the clamping ring 50 which, it will be recalled, also secures the peripheral beads 44 of the diaphragm.

In order that the control rod 110 will always align with the valve plunger 78, as has been previously set forth, it is necessary that the rotative positioning of the housing portion 51 with respect to the diaphragm 42 and hence the piston assembly 35 carried thereby, be accurately determined in assembling the units together. The method and means for accomplishing this is illustrated in Figure 4.

Here it will be seen that a threaded attachment bushing 177 is secured in the plate 130 and affords access to the interior of the housing 51 by removal of a threaded plug 178 therein.

The bushing 177 and the elbow fitting 62 by which the flexible internal conduit 32 is connected to the intermediate chamber 49 are so positioned on their respective mountings that the fitting 62 exactly underlies the bushing 177 when the piston assembly 35 and the housing portion 51 are in their proper relative rotative positions. A small alignment boss 179 is formed on the back of the fitting 62 in coaxial alignment with the threaded bore of the bushing 177. Thus, an alignment dowel 180 may be inserted through the bushing 177 to engage and align the piston assembly 35 during the clamping of the ring 50 which secures the housing 51 and the piston assembly 35 in their then position. It should be noted that the rod 100 is coaxial of the entire unit so as to permit rotation of the housing portion 51 thereabout. After the housing portions 51—52 are clamped together, the diaphragm 42 holds the piston assembly 35 against any rotation urged by the slight torque exerted by the conduit 32. In the presently preferred form, the alignment dowel 180 is hollow, and fits over the boss 179, although it will be realized that a small socket could be formed in the boss 179 and a small plug portion formed on the end of the dowel to fit thereinto. After alignment and clamping, as stated, the plug 178 may be replaced.

The bushing 177 serves the additional purpose of communicating the chamber 31, if desired, with a similar power unit control on, for example, a trailer unit whereby to coordinate the operation of brakes in a tractor and trailer. Relay valves and other means by which changes in pneumatic pressure may be employed to actuate pneumatic-hydraulic apparatus are well-known in the art and need not be discussed in detail herein. Suffice it to say that when the unit 20 is operated and air admitted into the chamber 31, the resulting increase in pressure can be employed as a signal to concordantly operate other similar units or pneumatic-hydraulic equipment.

As has been previously stated, the housing portion 52, being several times the volume of the portion 50, serves as a convenient vacuum reservoir. It also serves as means for supporting the entire unit on the frame of a motor vehicle. In Figure 6, a pair of bands 185 and 186 are shown to surround the housing portion 52 and are provided with U-shaped brackets 187 and 188, by which the entire device may be conveniently mounted to a portion of the frame of a motor vehicle. The bands 185 and 186 are provided with conventional clamping abutments and bolts similar to those used in the clamping ring 50. The bands 185 and 186 may be rotated and clamped in various positions with respect to the unit 20 whereby it may be hung beneath, supported above, or attached to one side or the other of a horizontal member in the vehicle frame, as may be desired.

Operation

The essential objective in any hydraulic brake system is to deliver a given volume of fluid to the brake cylinders at a certain pressure, thus resulting in applying a given stopping force to the vehicle. While the ultimate effect of a braking system is to apply a resistive force, the requirement to produce this force is not another force, but is power, i. e., force exerted over a distance. In the case of hydraulic systems, the distance factor is represented by a volume of fluid. A volume of fluid is required in applying brake pressure due to the fact that the brake lines, brake cylinders, drums, and lining, all yield somewhat when the braking pressure is applied thereto.

The amount of the just-described yield, or "breathing" as it is sometimes called, determines and fixes the volume of fluid that must be supplied at any given brake pressure to actually produce a given force of the shoes against the drums.

Additionally, of course, a certain initial volume must be delivered at a somewhat reduced pressure to move the shoes into contact with the drums. This initial volume of fluid is resisted, not only by the return springs in the brakes (e. g., 22a in Figure 1), but if, in an emergency, the brakes are to be applied very suddenly, the inertia of the fluid in the lines and the inertia of all the mechanical parts involved also resists the delivery of initial fluid. Thus, it is desirable to be able, if needed, to deliver subsubstantially the entire volume of fluid (the shoe moving volume plus the force producing volume plus a safety factor) at maximum pressure. Accordingly, the maximum power requirement of the system should and may be conveniently considered as the total volume of fluid deliverable to the brake system times the maximum delivery pressure.

The power available from the operator is equal to the average pedal force times the pedal stroke length. Both of these factors are, in a practical matter, limited. The maximum pedal force is limited to that which will not unduly tire the operator and will permit accurate control of the brakes, and the pedal stroke is limited by the dimensions of the operator's compartment and by human anatomy.

In ordinary unaugmented braking systems, such as for example, as those in passenger cars, the entire volume of required fluid is supplied from the master cylinder, and the mechanical advantage in the linkage between the pedal and the master cylinder is so adjusted as to give optimum pedal stroke and pressure. The optimum and usual value of pedal pressures is an average of approximately 35 pounds, with a maximum between 75 and 80 pounds.

It is desirable, and in fact necessary that, in trucks, buses and other large vehicles where much greater braking forces are required, the pedal force still be maintained at around 75 to 80 pounds as a maximum. The presently described embodiment of the invention employs a maximum pedal force on the order of the above values, and the pedal linkage and master cylinder design illustrated produce a substantially uniformly increasing master cylinder pressure during thet entire pedal stroke. The ratio of the pedal force to the master cylinder pressure is such that the pedal force of about 55 pounds is required to produce a master cylinder pressure of 100 p. s. i.

From the drawings and the foregoing discussion, it will be obvious that so long as thte control piston 111 remains at the right-hand end of the control cylinder 25, and the check valve 112 is thus held open, the master cylinder pressure is delivered directly through the piston to the brake system. As soon as the motion of the control piston 111 closes the check valve, however, the fluid pressure in the brake system is multiplied by the ratio of the effective areas on the opposite sides of the piston 111, this ratio being that of the cross-section of the annular space surrounding the rod 110 to the internal diameter of the cylinder 25. The master cylinder and brake cylinder design of systems in which the present unit is designed to be used that substantially all of the volume of the master cylinder is required to fully apply the brakes.

Obviously, therefore, the volume of fluid in the aforesaid annular space is insufficient to fully operate the brakes. Thus, the aforesaid volume must be augmented, and in the present embodiment, it is so augemented by the addition of the volume in the annular space 105 surrounding the power rod 100.

The point at which the power unit 20 comes into operation in the present embodiment is relatively early in the brake applying cycle. In Figure 13, the operation of the device is graphically illustrated, and the initial portion 180 of the curve illustrates that portion of the cycle during which the master cylinder pressure is being delivered through the piston 111 directly to the brake system. There it will be seen that when the pedal force reaches approximately 28 pounds, the power system comes into operation and the brake pressure is multiplied as indicated by the relatively steep curve portion 182. A relatively flat branch portion 181 of the curve indicates the actual master cylinder pressures during the remainder of the operation cycle.

The point at which the power unit 20 starts to operate is termed "cut in," and the point at which it reaches the limit of its stroke and is no longer effective to add volume to the brake system is called "run out." These two points are so indicated in Figure 13. It will be apparent that even after the "run out" condition has been reached, additional pressure may be applied to the brake system by independent operation of the control rod 110, the pressure ratio still being determined by the relative areas on the opposite sides of the piston 111. The effect of this additional movement of the system is indicated by the flat portion 184 at the top of the curve in Figure 13.

It will be realized that during application of the brakes when the control rod 110 and power rod 100 are moving leftwardly, a portion of the resistive force is represented by the friction of the sealing rings 161 and 163 in the bushings 150 and 151, and also the O-rings 164a, 165a and 126 in the pistons 104 and 111. These forces thus result in slightly less than the theoretical pressure in the brake cylinders.

Conversely, when the brakes are being released under the reactive fluid pressure produced by the brake springs 22a and also the elastic deformtion of the entire braking system, the aforedescribed friction losses result in a slightly greater ratio between brake pressure and master cylinder pressure than theoretical.

The effect of the friction forces is indicated on the drawing by a displacement between the curve portion 182 wherein the brakes are being applied "on," and the portion 183 wherein the brakes are being released "off." The general effect in physical phenomena of displacement in the curve of cause and result as between increasing and decreasing coercive forces is generally termed hysteresis, and is so termed herein. It is also generally recognized that in all control systems, a minimum of hysteresis is desirable for optimum results. It will be noted that the curve of operation shown in Figure 13 shows a relatively small amount of hysteresis.

Certain frictional losses in the master cylinder, such as seal friction and the like, the effect of the return spring on the pedal, and certain other losses due to the geometry of the pedal-cylinder linkage make the actual master cylinder pressure somewhat less than would be determined by an arithmetical calculation based on the pedal pressure and stroke. This difference is indicated in Figure 13 by the vertical displacement between the actual master cylinder pressure curve 181 and the theoretical pressure curve indicated by the reference character 185.

Adverting to the discussion of operation, it will be seen that, in the initial position indicated in Figure 2, the control rod 110 is held near its extreme right-hand position by reason of the thrust exerted by the valve plunger 78 and urged by the compression spring 80. In this initial position, the valve assembly 36 is in a position in which the movable valve seat 79 is lifted from the valve member 70 and thus the chambers 29 and 31 are intercommunicated, permitting the compression spring 90 to hold the piston assembly 35 near but not quite at its extreme right-hand position.

Upon the first application of master cylinder pressure, it will be seen that the rod 110 will tend to move to the left by reason of the piston effect thereof extending through the bushing 150. Force tending to urge the rod 110 to the left will be the master cylinder pressure times the cross-sectional area of the rod 110, and will be resisted by the friction forces of the seals 161 and 162, and the force exerted by the compression spring 80.

As will later be discussed, the initial "cracking" of the valve 70 is accomplished by rightward movement of the air-vacuum piston assembly 35. As soon as the movable valve seat 79 closes against the valve member 70, the leftward motion of the rod 110 is additionally resisted by the valve lifting spring 74. As the latter spring is compressed, the valve 70 is lifted from its seat against the pressure plate 40, and air is permitted to rush into the chamber 31. As soon as this occurs, the air-vacuum piston assembly 35 moves to the left, causing the volume of fluid in the annular power chamber 105 to be added to the brake system in the manner previously described. The leftward movement of the piston assembly 35 carrying with it the valve assembly 36 causes the valve member 70 to again seat against the pressure plate 40 and terminate further delivery of air into the chamber 31.

Upon release of the pressure in the master cylinder by relieving the pedal pressure, the compression spring 80 is permitted to move the rod 110 rearwardly and also to open the movable valve seat 79 from the valve member 70 so as to permit air in the chamber 31 to escape into the vacuum reservoir 29. Such release of pressure from the chamber 31 tends to move the piston assembly 35 to the right, again closing the valve seat 79 against the valve 70, bringing the system to a new condition of balance determined by the then hydraulic pressure in the master cylinder and the then air pressure in the chamber 31.

As has been previously stated, one of the advantages of the present invention is the fact that the "cut in" occurs early in the brake applying cycle. This particular advantage is accomplished by a correct proportioning of the different factors which result in forces tending to operate the valve assembly 36. For example, it will be noted that, in the rest position of the unit, i. e., one in which no pedal pressure is being applied, the air-vacuum piston assembly is at a position slightly to the left of its extreme right-hand limiting position due to the fact that a resistive force is applied by the valve spring 80 tending to prevent the assembly from completely reaching its right-hand lifting position.

After the initial operation of the device and before the vacuum in the reservoir 29 has been fully restored, the pressure differential between the reservoir 29 and the chamber 31 is such that the control plunger is not returned all the way to the right. This results in the check valve 112 remaining closed and in the trapping of enough fluid in the brake cylinders to hold the shoes 22 close to the drums. Thus, a subsequent operation requires only a very small "squeeze" to apply the brakes. The net result of the foregoing characteristics is that a relatively large number of rapidly successive brake operations are possible without depleting the vacuum reservoir even if the engine is stalled and the vacuum is not being replenished.

The cross-sectional area of the annular space 105 is made somewhat larger than the cross-sectional area of the control plunger 110 whereby the initial master cylinder pressure acts on the power piston 104 to pull to the right on the air-vacuum piston assembly 35, causing a very rapid operation of the valve assembly 36, resulting in the aforesaid rapid "cut in."

The early "cut in" just described results in raising the air pressure in the chamber 31 before the brake shoe pressure is actually applied. From this fact stems another advantage of the present invention, to-wit, the fact that by using the pressure in the chamber 31 to control the operation of a trailer relay valve and brakes on such trailer, the trailer brakes will start to operate at least simultaneously if not somewhat ahead of the tractor brakes.

It will be evident that the pressure within the flexible internal conduit 32 always is at least equal to the external pressure acting thereon, and most of the time exceeds the external pressure. As the unit 20 is operated, the differential pressures acting on the conduit 32 vary, causing a "breathing" of the tube which relieves any excess strains in the extreme stroking position which might otherwise limit the size of the tube and its dependability in service.

For a clearer understanding of the invention, one example of a set of dimensions is hereinafter set forth, although it will be realized that the possible embodiments of the invention are not confined to the exact dimensions or proportions hereinafter set forth, except as defined and limited by the appended claims.

As has already been explained, and as is shown in Figure 13, a maximum pedal force of 75 pounds produces in the conventional master cylinder a pressure of 150 pounds. As has also been set forth previously, heavy duty requirements, such as in buses, trucks, and the like, will require a brake cylinder pressure on the order of 1435 pounds, say, a pressure increase ratio of 9½:1. This ratio is sometimes referred to as the boost ratio, and will be so termed herein, it being understood that the term "boost ratio" does not imply the use of the so-called "booster" systems.

The mean effective value of the vacuum conveniently produceable in the reservoir 29 is on the order of 20 in Hg, i. e., a pressure differential from atmospheric of 9.82 p. s. i.

The mean effective diameter of the piston assembly 35 operating in conjunction with the diaphragm 42 is 9.125 inches, thus giving a mean available force exerted by the piston assembly 35 of 640 pounds. Assuming a resistive force of 15 pounds for the return spring at its maximum deflection, and a resistive force of 7 pounds for seal friction, there will be a force available to develop hydraulic pressure of 618 p. s. i.

Dividing the 618 pounds available force by the required line pressure of, say, 1435 p. s. i., it will be seen that the effective area of the power piston 104 (the annular area to the left thereof) must be .4309 square inch.

Selecting a diameter of .672 (43/64) inch for the power rod 100, it will be seen that the total cross-sectional area of the power cylinder (.4309 for the annulus plus .3545 for the power rod) is .7854 square inch, i. e., the area of a one-inch diameter bore.

The length of the power stroke will be determined by the amount of fluid required to augment that delivered by the control cylinder to produce that required in the brake cylinders, plus an amount initially delivered into the power cylinder to effect operation of the air control valve assembly 36, as previously described. It will be remembered that the last-named amount of fluid, i. e., that required to operate the air control valve, is delivered directly through the control piston 111.

The conventional master cylinder 21, incorporated in the present example, has a 1.5 inch diameter, a 1.476 inch stroke, and thus a capacity of 2.55 cubic inches of fluid. Of this total amount, .176 cubic inch is lost during the initial movement of the master cylinder plunger to cover the conventional compensating orifice, identified in the drawings by the reference character 21a.

Thus, it will be seen that the remaining fluid available from the master cylinder for operation of the brakes and the power unit 20 is 2.373 cubic inches. Of this, the initial air valve operating portion delivered to the power cylinder is, for the dimensions above given, about .054 cubic inch, leaving available for the operation of the unit after "cut in" a volume of 2.319 cubic inches.

Turning now to the parameters entering the calculations of size of the control rod 110 and the control piston 111, it will be seen that several factors are involved.

First of all, insofar as the operation of the brakes themselves is concerned, the ratio between the diameter of the area of the control piston 111 and the area of the reactive annulus on the left-hand face thereof should be that above determined as 9.5:1. However, it must be remembered that sufficient additional force exertable by the control piston 111 must be available for operating the valve assembly 36.

The forces required to operate the valve assembly 36 are in turn dependent on the area thereof and the size of the compression spring 80. I have found that it is desirable to have approximately a ¾ inch inside diameter for the conduit 32 to provide air flow at a rapid enough rate, and accordingly, it will be seen that the valve opening must be equivalent in area. The force exerted by the spring 80 at "lapped" position is selected to be just sufficient to lift the valve seat 79 against maximum pressure differential but not appreciably more. This permits operation of the valve assembly by a minimum of operating force.

At a maximum vacuum of, say, 27 inches of mercury, there may be as much as 10 pounds of force seating the valve member 71 against the pressure plate 40. This force of 10 pounds is somewhat counterbalanced by the bellows construction from which it will be seen that the vacuum present within the valve member 70 when it is seated tends to unseat the valve. The difference between the seating force and the counterbalancing force is such as to produce a differential of 5 pounds tending to seat the valve against the plate 40. Added to this force is the elongating compression spring 74 which has a force of about 2 pounds, giving a total force necessary to lift the valve member 70 away from the pressure plate 40 of about 7 pounds.

The net effect of the compression spring 80 tending to resist closing movement of the movable valve seat 79 is about 8 pounds. A spring of this strength is required since it must be at the initial position shown in Figure 2, overcome not only seal friction in holding the rod 110 in its then position, but must also overcome the vacuum force acting on the plunger 110. Still further, the spring 80 must resist a force of about 7 p. s. i., produced by the residual pressure in the master cylinder.

Additionally, about 2 pounds should be available for actually operating the valve as rapidly as desired.

The seal friction resisting the movement of the control rod 110 is about 2 pounds, and an additional pound should be added for other friction in the unit, such for example, as the control piston 111.

The net effect of all of the above listed forces involved in the operation of the valve assembly 36 is that a force of approximately 12 pounds must be available from the control piston to operate the valve. The reaction opposing the 12 pounds of valve operating force will, it is realized, be produced by the annulus of the power cylinder 104. Since the area of this annulus is .4309, as above calculated, it will be seen that the pressure required to operate the valve assembly is the force of 12 divided by the area .4309, giving a pressure of 27.8 p. s. i., say, 30 pounds.

Adverting to the calculation of the control rod size, it will be seen that the theoretical boost ratio of 9.5:1 must be increased in order to provide for the operation of the valve assembly 36. Subtracting the 30 pounds valve operating pressure from the total master cylinder pressure of 150 p. s. i., and dividing the remaining 120 pounds into the desired brake pressure of 1435 p. s. i., the actual or, as it is termed herein, "corrected" boost ratio is 11.95:1, or approximately 12:1.

The foregoing figure of 12:1 is used in determining the actual size of the control cylinder and the size of the control rod. I have discovered that, to assure smooth, chatter-free operation of the power unit 20, it is essential that the first movement which takes place upon the application of the brakes is a rightward movement of the power rod, rather than a leftward movement of the control rod. To assure this mode of operation, the cross-sectional area of the control rod must be less than the annulus of the power cylinder 104. Furthermore, the amount of this difference in area multiplied by the pressures acting thereon must be greater than the difference of the seal frictions of the respective plungers in order that the control plunger will not move first, as aforesaid. I have found that a difference of approximately seven percent of the area, to-wit, in the present example, about .03 square inch difference in the aforesaid areas, produces the desired result; and I term this difference the "chatter factor."

On the other hand, it is not desirable to have the control rod very much smaller in area than the power annulus as this, it will be seen, would result in an undesirably long stroke. Accordingly, the chatter factor should never be less than seven percent of the area of the power annulus, and may be as much as fifty percent in large units having, say, a 1¾ inch diameter master cylinder.

In the present instance, the diameter of the control rod is 43/64, thus having an area of .3545 or 82.2 percent of the power annulus. It will be noted also that the diameter of the control rod is the same as that of the power rod, thus making it possible to use the same size O-rings throughout the unit.

Recapitulating, the corrected boost ratio is 12:1, and the volume remaining in the master cylinder after operation of the valve assembly 36 is 2.319 cubic inches. Therefore, if all of the remaining volume is delivered into the control cylinder to the right of the control piston 111, the amount delivered out of the annular space to the left of the control piston 111 will be ½ of 2.319, or .1936 cubic inch. It will be recalled that a total volume of 2.319 cubic inches is required by the brake system to effect full application of the brakes. Deducting the .1936 cubic inch supplied by the control annulus from the total requirement there will be required 2.179 cubic inches to be supplied by the power annulus. Dividing this last requirement by the area of the power annulus (2.179 divided by .4309), the required length of the power stroke is determined to be 5.05 inches. To this length of stroke must be added .25 inch to hold the stop member 116 against the pressure plate 40 at the end of the stroke.

By application of the corrected boost ration of 12:1, it will be seen that a bore of approximately 23/32 for the control cylinder is approximately the desired area. It will also be seen that this area times the length of stroke plus the aformentioned .054 cubic inch required to operate the valve assembly 36 will still leave a small amount of fluid in the master cylinder as a safety margin. This remaining amount of fluid may be delivered to the system after the run out, producing the flat portion 184 at the upper end of the curve shown in Figure 13.

The type of diaphragm illustrated in this construction and the arrangement of the internal conduit 32 easily permits the length of stroke just calculated.

In order to "trap" the vacuum in a reservoir section 29 of the housing 50—51, check valve 28a is provided in the line 28. This arrangement provides for a number of successive operations of the brake assembly, even after the motor is stopped, due to the vacuum power stored in the reservoir portion 29.

While the forms of the power unit shown and described herein are fully capable of achieving the objects and providing the advantages hereinbefore stated, it will be realized that many modifications are possible without departing from the spirit of the invention. For this reason, I do not mean to be limited to the forms shown and described, or to the dimensions hereinbefore set forth, but rather to the scope of the appended claims.

I claim:

1. An air-vacuum motor for augmenting manually applied power comprising in combination: an enclosed pressure-tight housing; a wall in said housing hermetically dividing the same into a vacuum chamber and a power chamber, said chambers being of complemental volumes the sum of which is constant, and said wall being movable in response to pressure in said power chamber; means positioned entirely within said housing limiting the movement of said wall toward said vacuum chamber, said limiting means being so positioned that the volume of said vacuum chamber is substantially greater than that of said power chamber when said wall is in said limited position and two parallel force transmitting members extending slidably and sealably through a fixed wall of said power chamber to connect said movable wall with an external movable object to apply force thereto and to follow-up movement of said object.

2. In a fluid pressure system of the type having a master source of manually pressurized fluid, a primary fluid motor connected to receive fluid from said master source to operate said primary motor, and a differential fluid pressure actuated servo motor and pump pressure-controlled by said master source to deliver additional fluid under pressure to said primary motor, a fluid pressure control assembly for said servo motor comprising in combination: walls defining a fluid pressure reservoir for said servo motor, a fluid pressure power chamber for said servo motor, and an intermediate delivery chamber therebetween, said delivery chamber having an opening into said power chamber; means connecting said delivery chamber to a source of fluid pressure different from that of said reservoir; an annular poppet valve normally closing said delivery chamber opening, said poppet valve having a passageway therethrough intercommunicating said reservoir and power chamber; a movable valve seat member adjacent a mouth of said passageway and supported for movement toward the same to close passageway; a control member extending through an exterior wall of said power chamber and positioned and adapted to operate said poppet valve to control fluid flow between said delivery chamber and power chamber and to concurrently operate said valve seat member to control fluid flow between said reservoir and power chamber; and a fluid pressure responsive element connected to said control member to actuate the same, said pressure responsive element having a first pressure responsive area exposed to fluid at the pressure of said master source and a second oppositely facing pressure responsive area exposed to fluid at the pressure of said primary motor.

3. In a fluid pressure motor of the type having a pair of adjoining pressure chambers and a movable wall assembly for separating said chambers and performing work in response to differential pressures therein, said wall assembly comprising in combination: a diaphragm peripherally secured between said chambers and having a central aperture; a pair of opposed pressure plates disposed across said aperture with said diaphragm disposed between the peripheral edges of said plates; securing means including a member extending through said plates to clamp the two together with said diaphragm therebetween, said plates, diaphragm and securing means defining a delivery chamber intermediate said pressure chambers, said delivery chamber having an inlet and an outlet opening; a conduit fitting secured in said inlet to receive a flexible fluid conduit to deliver fluid to said delivery chamber; and a movable valve means normally closing said outlet opening.

4. In a fluid pressure motor of the type having a pair of adjoining pressure chambers and a movable wall assembly for separating said chambers and performing work in response to differential pressures therein, said wall assembly comprising in combination: a diaphragm peripherally secured between said chambers and having a central aperture; a pair of opposed pressure plates disposed across said aperture with said diaphragm disposed between the peripheral edges of said plates; securing means including a member extending through said plates to clamp the two together with said diaphragm therebetween, said plates, diaphragm and securing means defining a delivery chamber intermediate said pressure chambers, said delivery chamber having an inlet opening, and a pair of additional openings in said plates, one exposed to each of said pressure chambers; a conduit fitting in said inlet opening adapted to receive a flexible conduit to deliver fluid to said delivery chamber; and a valve member in said delivery chamber disposed between said additional openings and adapted to normally close the same with respect to said delivery chamber, said valve member having a movable end to open one of said openings to intercommunicate said delivery chamber and one of said pressure chambers and said valve member having a passageway therethrough to intercommunicate said pressure chambers with each other.

5. In a fluid pressure motor of the type having a pair of adjoining pressure chambers, a movable wall assembly for separating said chambers and performing work in response to differential pressures therein comprising in combination: a diaphragm peripherally secured between said chambers and having a central aperture; a pair of opposed pressure plates disposed across said aperture with said diaphragm disposed between the peripheral edges of said plates; securing means including a member extending through said plates to clamp the two together with said diaphragm therebetween, said plates, diaphragm and securing means defining a delivery chamber intermediate said pressure chambers, said delivery chamber having two aligned openings, one leading into each of said pressure chambers, and a third inlet opening; a conduit fitting in said inlet opening to receive a flexible fluid conduit to deliver fluid into said delivery chamber; a flanged tubular valve member disposed in said delivery chamber in alignment with said first two openings and normally abutting the interior walls of said delivery chamber to close said first openings with respect to said delivery chamber, one of the ends of said valve being movable away from said delivery chamber wall to communicate said delivery chamber with one of said pressure chambers through one of said first openings, said two pressure chambers being normally intercommunicated through said tubular valve member; a movable valve stem coaxially positioned within said tubular valve and spaced therefrom to permit free passage through said tubular valve member past said stem, said stem being slidingly supported in one of said pressure plates; and a valve seat member on an end of said stem adjacent said movable end of said tubular member and normally spaced therefrom, said valve seat portion being adapted upon sliding movement of said stem first to close the passage through said tubular member and thereafter to move said movable valve end to open said delivery chamber opening as aforesaid.

6. In a fluid pressure motivated servo motor of the type having a pair of adjoining pressure chambers, a movable wall assembly for separating said chambers and performing work in response to differential pressures therein, and fluid delivery and control means carried by said wall to selectively deliver pressurized fluid to one of said chambers whereby to produce said pressure differential, a follow-up member for operating said delivery and control means comprising in combination: a movable rod aligned with the direction of movement of said wall and having an end positioned adjacent said control means; bearing means supporting said rod for reciprocal movement in the direction of said wall movement, whereby to engage said rod end with said control means to operate the latter; and a flanged dished abutment member secured to said rod end and adapted to engage said wall adjacent said control means to limit the movement of said rod toward said wall.

7. An air-vacuum power unit comprising in combination: a cylindrical pressure-tight housing transversely divided into two sections, said sections having abutting circular ends, and each having an outer end wall, said sections defining a pair of adjoining pressure chambers, one of which is a power chamber; a longitudinally extending hydraulic cylinder mounted on the end wall of said power chamber, said cylinder being radially displaced from the axis of said housing; a piston in said cylinder; transverse diaphragm means peripherally clamped between said abutting section ends to hermetically separate said chambers, said diaphragm means being movable in response to differential pressures in said chambers; control means carried by said diaphragm means to selectively admit air into said power chamber or release air therefrom to move said diaphram means as aforesaid, said control means having an operating member radially displaced from said housing axis by an amount equal to the displacement of said cylinder from said axis; a follow-up rod connected to said piston and extending longitudinally into said power chamber, said rod being guidingly supported by said end wall and adapted to engage said operating member to operate said control means; and alignment means to rotatively position said diaphragm means with respect to said cylinder, said alignment means comprising a longitudinally aligned bearing member in said end wall and a locating member carried by said diaphragm means, the angular displacement of said bearing means from said cylinder being substantially equal to the angular displacement of said locating means from said control member, whereby said diaphragm may be rotatively positioned with respect to said abutting ends by inserting an alignment dowel through said bearing means and engaging said dowel with said locating member.

8. In combination with a power unit of the type having a fluid pressure chamber, control means for venting said chamber comprising: valve means including a movable, passage-blocking member having a predetermined effective first area and a valve seat adjacent said passage-blocking member and disposed in a wall of said chamber; and a control rod positioned and connected to move said member against said seat, said rod being movably and sealably extended through a wall opening of said chamber, the cross-sectional area of said rod at said wall opening being substantially equal to said first area whereby the fluid pressure in said chamber exerts substantially equal forces on said valve member and said rod.

9. In combination with a power unit of the type having a fluid pressure chamber, control means for venting said chamber comprising: valve means including a passageway through a first wall of said chamber and a valve member supported in said chamber for movement toward said passageway to block the same, said passageway having a predetermined cross-sectional area where blocked; and a control rod positioned and connected to move said member toward and away from said passageway, said rod being movably and sealably extended through a second wall of said chamber opposite said first wall, the cross-sectional area of said rod at said second wall being substantially equal to said predetermined cross-sectional area whereby fluid pressure in said chamber exerts substantially equal and opposite forces on said valve member and said rod.

10. In a fluid pressure power unit, a valve for controlling the flow of fluid between either of a first chamber and a second chamber of differing pressures, and a third chamber having a third pressure, said first chamber having two openings therein one communicating with each of said second and third chambers: a continuous, impervious, tubular member of resilient material positioned within said first chamber and having a fixed end sealably secured in the opening to said second chamber and a movable end normally in sealable abutment with the other opening whereby to intercommunicate said second and third chambers through said tubular member and isolate said first chamber from the others; means to close said tubular member to isolate said second chamber; and means to move said movable end away from said opening which it normally abuts to intercommunicate said first and third chambers around said movable end.

11. In a fluid pressure power unit, a valve for controlling the flow of fluid between either of a first chamber and a second chamber having high and low pressures respectively, and a third chamber having a third pressure intermediate said first pressures, said first chamber having two openings therein one communicating with each of said second and third chambers: a continuous, impervious, tubular member of resilient material, said member being circumferentially corrugated to permit longitudinal compression and prevent collapse due to internal vacuum, said member being positioned within said first chamber and having a fixed end sealably secured in the opening to said second chamber and a movable end normally in sealable abutment with the other opening whereby to intercommunicate with said second and third chambers through said tubular member and to isolate said first chamber from the others; means to close said tubular member to isolate said second chamber; and means to longitudinally compress said tubular member to move said movable end away from said opening which it normally abuts to intercommunicate said first and third chambers around said movable end.

References Cited in the file of this patent

UNITED STATES PATENTS

| | | |
|---|---|---|
| 396,151 | Finn | Jan. 15, 1889 |
| 1,679,762 | Bragg et al. | Aug. 7, 1928 |
| 1,746,797 | Schoen | Feb. 11, 1930 |
| 1,765,760 | Duty et al. | June 24, 1930 |
| 1,826,418 | Bragg et al. | Oct. 6, 1931 |
| 1,923,185 | Bragg et al. | Aug. 22, 1933 |
| 1,990,194 | McNeil | Feb. 5, 1935 |
| 1,998,913 | Wheaton | Apr. 23, 1935 |
| 2,032,185 | Sciaky | Feb. 25, 1936 |
| 2,082,228 | Stoll | June 1, 1937 |
| 2,314,683 | Berry | Mar. 23, 1943 |
| 2,318,590 | Boynton | May 11, 1943 |
| 2,322,063 | Schnell | June 15, 1943 |
| 2,377,699 | Klimkiewicz | June 5, 1945 |
| 2,388,220 | Rockwell | Oct. 30, 1945 |
| 2,398,252 | Rockwell | Apr. 9, 1946 |
| 2,458,803 | Stelzer | Jan. 11, 1949 |
| 2,468,706 | Price | Apr. 26, 1949 |
| 2,485,504 | Morgan | Oct. 18, 1949 |
| 2,524,273 | Saler | Oct. 3, 1950 |
| 2,533,531 | Stephens | Dec. 12, 1950 |
| 2,547,957 | Meadows | Apr. 10, 1951 |
| 2,593,193 | Rockwell | Apr. 15, 1952 |
| 2,598,604 | Ringer | May 27, 1952 |
| 2,617,261 | Ringer | Nov. 11, 1952 |

OTHER REFERENCES

Ser. No. 418,664, Neugebauer (A. P. C.), published May 25, 1943.